United States Patent
Zhao et al.

(10) Patent No.: US 9,848,434 B2
(45) Date of Patent: Dec. 19, 2017

(54) METHODS AND DEVICES FOR CONTENTION BASED RANDOM ACCESS

(71) Applicant: Telefonaktiebolaget L M Ericsson (publ), Stockholm (SE)

(72) Inventors: Wei Zhao, Stockholm (SE); Ying Sun, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 45 days.

(21) Appl. No.: 14/907,313

(22) PCT Filed: Jul. 29, 2013

(86) PCT No.: PCT/SE2013/050938
§ 371 (c)(1),
(2) Date: Jan. 25, 2016

(87) PCT Pub. No.: WO2015/016754
PCT Pub. Date: Feb. 5, 2015

(65) Prior Publication Data
US 2016/0174237 A1 Jun. 16, 2016

(51) Int. Cl.
*H04W 72/10* (2009.01)
*H04W 74/08* (2009.01)
(Continued)

(52) U.S. Cl.
CPC ....... *H04W 72/10* (2013.01); *H04W 74/0833* (2013.01); *H04W 48/12* (2013.01); *H04W 74/006* (2013.01)

(58) Field of Classification Search
None
See application file for complete search history.

(56) References Cited

U.S. PATENT DOCUMENTS 8,964,659 B2 * 2/2015 Vujcic ................ H04W 74/002
370/329
9,380,605 B1 * 6/2016 Lee .................... H04W 74/0833
(Continued)

FOREIGN PATENT DOCUMENTS

EP 1916863 A2 4/2008
EP 2523518 A1 11/2012

OTHER PUBLICATIONS

Author Unknown, "Technical Specification Group Radio Access Network; Evolved Universal Terrestrial Radio Access (E-UTRA); Medium Access Control (MAC) protocol specification (Release 11)," Technical Specification 36.321, Version 11.3.0, 3GPP Organizational Partners, Jun. 2013, 58 pages.
(Continued)

*Primary Examiner* — Hong Cho
(74) *Attorney, Agent, or Firm* — Withrow & Terranova, PLLC

(57) ABSTRACT

The present teachings relates to methods performed in a network node of a wireless communication network. The method comprises: broadcasting one or more threshold values enabling the wireless devices to determine fulfillment of one or more criteria for selecting a contention based random access preamble either from a first preamble group or from a second preamble group for use in a contention based random access procedure; transmitting to a selected wireless device one or more threshold values using dedicated signaling, the one or more threshold values sent in the dedicated signaling overriding a corresponding broadcasted threshold value and being set so that the wireless device fulfills the criteria to select a preamble from the first preamble group, wherein the threshold values sent on the dedicated signaling differ from the broadcast threshold val-
(Continued)

ues; and prioritizing preambles of the first preamble group over preambles of the second preamble group.

17 Claims, 3 Drawing Sheets

(51) Int. Cl.
*H04W 74/00* (2009.01)
*H04W 48/12* (2009.01)

(56) References Cited

U.S. PATENT DOCUMENTS

| | | | |
|---|---|---|---|
| 2010/0074130 A1 | 3/2010 | Bertrand et al. | |
| 2011/0194432 A1* | 8/2011 | Kato | H04W 74/002 370/252 |
| 2013/0012219 A1* | 1/2013 | Fischer | H04W 74/004 455/450 |
| 2013/0250899 A1* | 9/2013 | Jeong | H04W 74/002 370/329 |

OTHER PUBLICATIONS

Author Unknown, "Technical Specification Group Radio Access Network; Evolved Universal Terrestrial Radio Access (E-UTRA); Radio Resource Control (RRC); Protocol specification (Release 11)," Technical Specification 36.331, Version 11.4.0, 3GPP Organizational Partners, Jun. 2013, 346 pages.
International Search Report and Written Opinion for International Patent Application No. PCT/SE2013/050938, dated Apr. 25, 2014, 11 pages.

* cited by examiner

METHODS AND DEVICES FOR CONTENTION BASED RANDOM ACCESS

This application is a 35 U.S.C. §371 national phase filing of International Application No. PCT/SE2013/050938, filed Jul. 29, 2013, the disclosure of which is incorporated herein by reference in its entirety.

TECHNICAL FIELD

The technology disclosed herein relates generally to the field of wireless communication networks, and in particular to random access procedures within such wireless communication networks.

BACKGROUND

A random access procedure used in a wireless communication network allows wireless devices to obtain new or renewed access to the network and to obtain uplink time synchronization. There are different reasons for the wireless device to transmit a random access request, for example when desiring initial access to the network, or when it has been set out-of-synchronization in a downlink/uplink and need to perform a random access procedure to receive a downlink data transmission/send an uplink transmission or when there is an imminent handover.

The random access procedure may be either contention based or contention free. The former is applicable for all the mentioned cases, while the latter is applicable only to downlink data transmission and incoming handover.

In the contention based random access (CBRA) procedure, also denoted the general random access procedure, a number of preamble sequences are used in common by all wireless devices. The wireless devices can use any one of the preamble sequences and CBRA thus requires signaling to resolve any contention that may have occurred. The contention free random access (CFRA) procedure, also denoted the dedicated, the non-contention based or the contention less random access procedure, uses a preamble sequence that is dedicated for one wireless device to use.

The signaling between the wireless device and a radio access network (RAN) for the CBRA procedure is illustrated in FIG. 1 and described in the following for a Long Term Evolution (LTE) scenario. The wireless device (denoted UE in the figure) initiates the CBRA procedure by transmitting (arrow 1 in FIG. 1) a randomly selected CBRA preamble from within the CBRA preamble range which is received via System information block 2 (SIB2). SIB2 carries radio resource configuration information which is common for all wireless devices. The RAN, and in particular a eNodeB (evolved Node B, also denoted eNB) thereof, acknowledges the detected CBRA preamble by transmitting (arrow 2 in FIG. 1) a random access response message including among other things an initial grant to be used on an uplink shared channel, a timing advance (TA) update and a temporary cell-Radio Network Temporary Identity (C-RNTI). When receiving the response the wireless device uses the grant to transmit (arrow 3 in FIG. 1) a message that serves the purpose of verifying that the wireless device received the random access response and includes necessary information for the purpose of contention resolution. The RAN receives this message and performs contention resolution (arrow 4 in FIG. 1) based on information received in the message and eventually one wireless device will detect random access (RA) success while other wireless devices will roll back to do CBRA over again.

The wireless device can perform CBRA in all the four cases mentioned earlier. On the eNB side, when multiple preambles are received within the same Physical Random Access Channel (PRACH) occasion, a known method is to sort the preambles based on the received signal power and schedule the random access response transmissions (arrow 2 of FIG. 1) in accordance with this sorting.

Since the wireless devices are scheduled based on the received preamble power, a wireless device having less favorable radio conditions has to wait the longest for a random access response transmission. A wireless device in a handover situation often has such less favorable radio conditions, and may loose its connection to the wireless communication network. Operators of the wireless communication networks are well aware of the fact that users are typically more annoyed and dissatisfied when being disconnected during an ongoing call than when having to wait to obtain an initial access to the wireless communication network. There is thus a need for improvement in this regards.

SUMMARY

An object of the present teachings is to provide methods and devices addressing the above need, in particular addressing the need for a more flexible order in which random access responses are transmitted.

The object is according to a first aspect achieved by a method performed in a network node of a wireless communication network providing wireless communication to wireless devices. The method comprises: broadcasting one or more threshold values enabling the wireless devices to determine fulfillment of one or more criteria for selecting a contention based random access preamble either from a first preamble group or from a second preamble group for use in a contention based random access procedure; to a selected wireless device one or more threshold values using dedicated signaling, the one or more threshold values sent in the dedicated signaling overriding a corresponding broadcasted threshold value and being set so that the wireless device fulfills the criteria to select a preamble from the first preamble group, wherein the threshold values sent on the dedicated signaling differ from the broadcast threshold values; and prioritizing preambles of the first preamble group over preambles of the second preamble group.

The method provides for a more flexible ordering of random access responses in a contention based random access procedure and in particular enables differentiation of the wireless devices. The method thereby enables e.g. differentiating and prioritizing of wireless devices in a handover situation over other wireless devices. Reduced handover drop rates are achieved and thereby also increased user satisfaction.

The object is according to a second aspect achieved by a network node of a wireless communication network providing wireless communication to wireless devices. The network node comprises a processor and memory, the memory containing instructions executable by the processor, whereby the network node is operative to: broadcast one or more threshold values enabling the wireless devices to determine fulfillment of one or more criteria for selecting a contention based random access preamble either from a first preamble group or from a second preamble group for use in a contention based random access procedure; transmit to a selected wireless device one or more threshold values using dedicated signaling, the one or more threshold values sent in the dedicated signaling overriding a corresponding broadcasted threshold value and being set so that the wireless device fulfills the criteria to select a preamble from the first preamble group, wherein the threshold values sent on the dedicated signaling differ from the broadcast threshold values; and prioritize preambles of the first preamble group over preambles of the second preamble group.

The object is according to a third aspect achieved by a computer program for a network node of a wireless communication network providing wireless communication to wireless devices. The computer program comprises computer program code, which, when run on the network node causes the network node to: broadcast one or more threshold values enabling the wireless devices to determine fulfillment of one or more criteria for selecting a contention based random access preamble either from a first preamble group or from a second preamble group for use in a contention based random access procedure; transmit to a selected wireless device one or more threshold values using dedicated signaling, the one or more threshold values sent in the dedicated signaling overriding a corresponding broadcasted threshold value and being set so that the wireless device fulfills the criteria to select a preamble from the first preamble group, wherein the threshold values sent on the dedicated signaling differ from the broadcast threshold values; and prioritize preambles of the first preamble group over preambles of the second preamble group.

The object is according to a fourth aspect achieved by a computer program product comprising a computer program as above, and a computer readable means on which the computer program is stored.

Further features and advantages of the present teachings will become clear upon reading the following description and the accompanying drawings.

DETAILED DESCRIPTION

Figure 1:
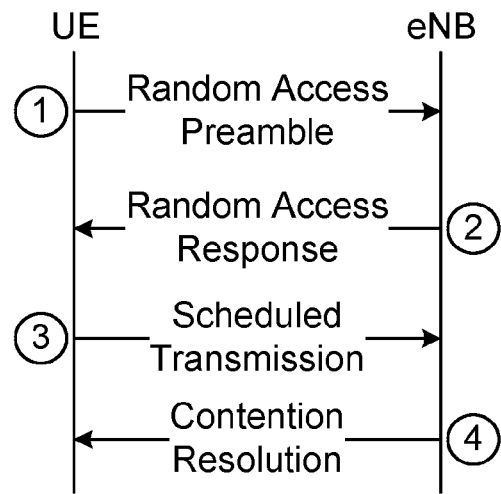
FIG. 1 is a sequence diagram illustrating signaling in a contention based random access procedure.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Figure 2:
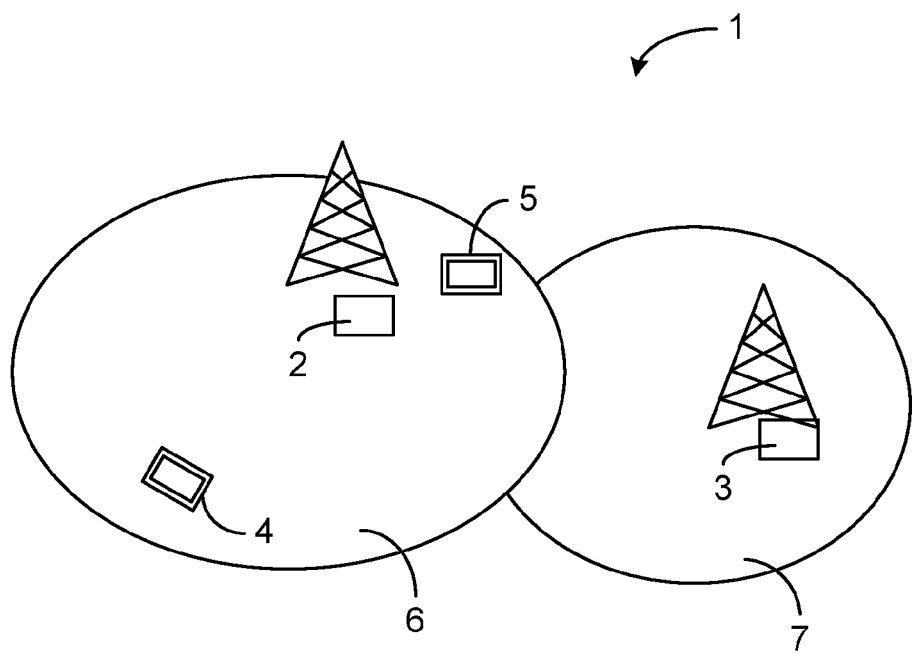
FIG. 2 illustrates schematically an environment in which embodiments of the present teachings may be implemented.

FIG. 2 illustrates schematically an environment, in particular a communication system 1, in which embodiments of the present teachings may be implemented. The communication system 1 comprises a number of network nodes 2, 3 configured to provide wireless communication connections to a number of wireless devices 4, 5. The wireless devices 4, 5 may comprise any type of device configured for wireless communication. Such device may be denoted and exemplified in various ways e.g. a user equipment, a mobile communication device, subscriber terminal, and may comprise e.g. a cellular telephone, a computing device, a smart phone etc.

The network nodes 2, 3 are configured to provide uplink and/or downlink connections to the wireless devices 4, 5 residing within a coverage area 6, 7 of the network nodes 2, 3. The network nodes 2, 3 may comprise e.g. eNodeBs (also denoted eNB) of a LTE system and are configured to handle random access procedures. The network nodes 2, 3 are also configured to handle e.g. handover situations when a wireless device 4, 5 moves from the coverage area 6 of a first network node 2 to the coverage area 7 of a second network node 3, as well as if the wireless device is changing serving network node for other reasons.

In order to provide thorough understanding of the present teachings, description of the existing contention based random access (CBRA) procedures for LTE is provided in parallel with descriptions of embodiments of the present teachings. Existing CBRA procedure was described in relation to FIG. 1, but will be described in more detail in the following along with aspects of the present teachings.

In LTE, there are 64 preambles, one part of which is used for CBRA and one remaining part of which is used for contention free random access (CFRA). A preamble belonging to CFRA is dedicated for a particular wireless device and is typically used by a wireless device having pending downlink (DL) data or by wireless devices that are in a handover situation. The present teachings mainly relate to and address CBRA preambles.

In LTE, the CBRA preambles can be separated into two groups: group A and group B [refer to 3GPP 36.321 Mac Protocol Specification for further details]. Wireless devices are configured with such group A and group B preambles and will select a preamble from one of the groups based on different criteria. Basically, the wireless device will select a preamble from group B if it is under good radio conditions and has a rather large buffer size. Wireless devices under poor radio conditions will select a preamble from group A. The wireless device sending a preamble from group B will then typically be granted a larger uplink (UL) than a wireless device sending a preamble from group A.

In systems implementing random access preamble group B, the following information should be made available to the wireless devices, e.g. broadcasted to them, before a random access procedure occurs:

messagePowerOffsetGroupB, which is a threshold value for power offset for selecting group B preambles, and messageSizeGroupA, which is a threshold value for the size of data buffer for selecting group A preambles $P_{CMAX,c}$, which is the transmitted power of the wireless device configured by a serving cell performing the random access procedure deltaPreambleMsg3, which is the offset between the preamble and the scheduled transmission, Msg3, sent by the wireless device during the random access procedure (compare arrow 3 of FIG. 1)

preambleInitialReceivedTargetPower, which is a preamble initial received target power with values from −120 dBm to −90 dBm with step size of 2 dBm It is noted that the same threshold values is currently used for all wireless devices. In contrast, aspects of the present teachings comprise conveying, e.g. by dedicated signaling, differing threshold values to particular wireless devices 4, 5. For example, wireless devices 4, 5 in a handover situation (denoted HO wireless device in the following) may be chosen to be given other threshold values than it would get in accordance with prior art.

When the wireless device starts the CBRA procedure and tries to select a CBRA preamble it first decides from which preamble group to pick a random access preamble from. If Random Access Preambles group B exists and if the buffer size m (data available for transmission plus MAC header and, where required, MAC control elements) of the wireless device is greater than the threshold messageSizeGroupA and if the pathloss is less than $P_{CMAX,c}$ (of the serving cell performing the random access procedure)—preambleInitialReceivedTargetPower—deltaPreambleMsg3—messagePowerOffsetGroupB, then the wireless device will select the Random Access Preambles group B. Otherwise it will select the Random Access Preambles group A. That is, the wireless device will select a random access preamble from group B if the following two criteria, f1 and f2, are fulfilled:

$m$>messageSizeGroup$A$  [f1]

and pathloss<$P_{CMAX,c}$-preambleInitialReceivedTargetPower-deltaPreambleMsg3-messagePowerOffsetGroup$B$  [f2]

and else the wireless device will select a random access preamble from group A.

In general, a wireless device transmitting a preamble from group B should be given a larger uplink (UL) grant than a wireless device using a preamble from group A. That is, when eNB receives a preamble from group B (transmitted by a wireless device), it will grant a larger UL to the wireless device that transmitted this preamble than to a wireless device from which it received a preamble from group A. Other than that the eNB currently treats group A and group B CBRA preambles equally. It is thus currently not specified in the standard that the eNB should differentiate between the two groups of preambles, i.e. the current standards contain no indication on if and how to treat these preambles differently, e.g., prioritize one group over another group.

In the prior art thus, the eNB does not differentiate over why wireless devices are performing random access and solely schedules the wireless devices 4, 5 for the random access response based on the received preamble signal strength. However, as mentioned earlier, there are situations wherein it would be advantageous to be able to differentiate between the wireless devices and prioritize among them. For example, it would be advantageous to schedule wireless devices in handover situations for random access responses before scheduling wireless devices performing random access for other reasons, such as for example initial access or re-synchronization; i.e. prioritize HO wireless devices.

In aspects of the present teachings, group B CBRA preambles are given priority over group A CBRA preambles.

Information based on which the wireless device 4, 5 should decide which CBRA preamble group to choose from, i.e. information comprising the parameter values messagePowerOffsetGroupB, messageSizeGroupA, $P_{CMAX,c}$ and deltaPreambleMsg3, can be made available to wireless devices either via System Information Block (SIB) broadcasting or dedicated Radio Resource Control (RRC) signaling during handover (HO). Among those parameters, messageSizeGroupA and messagePowerOffsetGroupB are today used only for the purpose of selecting a preamble group. In different embodiments, the present teachings use these parameters with the purpose of leading HO wireless devices into selecting a preamble from group B and other wireless devices into selecting a preamble from group A.

The present teachings thus provide, in an aspect, solutions to prioritizing wireless devices in handover situation over other wireless devices during preamble transmission/reception phase of the CBRA (arrows 2 and 3 of FIG. 1).

In accordance with embodiments of the present teachings, the mentioned parameters are set in such a way that wireless devices that are using broadcast thresholds (as obtained e.g. during SIB broadcasting) in preamble group selection are in reality prevented from selecting group B, or it will at least be very difficult, if at all possible, for those wireless devices to select a preamble from group B. For HO wireless devices, however, those thresholds and parameters can be overwritten by dedicated RRC signaling so that it is easy for HO wireless devices to select a preamble from preamble group B.

The presently allowed values for messageSizeGroupA and messagePowerOffsetGroupB as defined in 3GPP 36.331 RRC Protocol Specification, are:
messageSizeGroupA={56,144,208,256}
messagePowerOffsetGroupB={-infinity,dB0,dB5,dB8,dB10,dB12,dB15,dB18}

In the SIB2 broadcasting, from which wireless devices other than HO wireless devices, or more generally non-prioritized wireless devices, will get these thresholds, the broadcasted thresholds need to make the wireless devices break either the criterion [f1] or criterion [f2] mentioned earlier. That is, messageSizeGroupA should be as big as possible, and the subtraction $P_{CMAX,c}$—preambleInitialReceivedTargetPower—deltaPreambleMsg3—messagePowerOffsetGroupB should be as small as possible. Since it is difficult to predict the buffer size of wireless devices, it may be easier to make the non-HO wireless devices to break [f2]. That is, in order to get as many wireless devices as possible to break the criterion [f2], it should be as easy as possible for a wireless device to get a pathloss value below the threshold leading it to choose a group A preamble. A closer look at [f2] reveals:

$P_{cmax,c}$: a typical value is 23 dBm
preambleInitialReceivedTargetPower: default value is -116 dB
deltaPreambleMsg3: in the range from -2 dB to -12 dB
messagePowerOffsetGroupB: from -infinity to 18 dB In one embodiment, among those parameters only messagePowerOffsetGroupB is used for preamble group selection, without manipulating the other two parameters. In order to get a minimal threshold to [f2], messagePowerOffsetGroupB should be set to maximum allowed value=18. By this setting, a pathloss threshold will fall into the following range: 109 dB~123 dB.

However, it is common for non-HO wireless devices performing random access to have a pathloss smaller than 122 dB, so this threshold is not good enough to prevent non-HO wireless devices from selecting preamble group B. When implementing this aspect of the present teachings, and in order to conform to 3GPP 36.331 RRC protocol specification, this would imply a change of the range as defined therein. In particular, a parameter value range change to 3GPP 36.331 RRC protocol specification is suggested in accordance with:
messagePowerOffsetGroupB: change maximum allowed value from 18 dB to a value higher than 18 dB, for example 30 dB or 50 dB or 100 dB or even higher.

This way the threshold to [f2] will have a range of 40-50 dB, making it easy for non-HO wireless devices (i.e. non-prioritized wireless devices) to break [f2].

In RRC signaling, in particular RRC reconfiguration sending handover command, where HO wireless devices get these threshold values, the following values can be signaled: messageSizeGroupA=56, messagePowerOffsetGroupB=−infinity,
making it much easier (if not always) for HO wireless devices to conform to both [f1] and [f2], thus selecting preamble group B.

On eNB side, the preamble is received. When scheduling random access responses (compare the second message of FIG. 1) for DL scheduling and scheduled transmission for uplink (compare the third message of FIG. 1), the following prioritization based on received preamble is made, in accordance with an embodiment of the present teachings:

- CFRA group has higher priority than CBRA group (which is an existing mechanism)
- Within the CBRA group, CBRA group B preambles have higher priority than CBRA group A preambles (suggested and made possible by the present teachings)
- Within each group (i.e., CFRA, CBRA group B, CBRA group A), preambles are sorted based on received signal strength By using the above, it is possible to prioritize between the wireless devices, even if they use CBRA. In particular:

- HO wireless devices using CFRA will be scheduled first
- If for some reason that HO wireless devices roll back to CBRA (e.g., because the CFRA feature is not available, or because no CFRA preamble resource is available, etc.), they are still most likely scheduled for DL random access response (compare message 2 of FIG. 1) before e.g. wireless devices seeking initial access.

Figure 3:
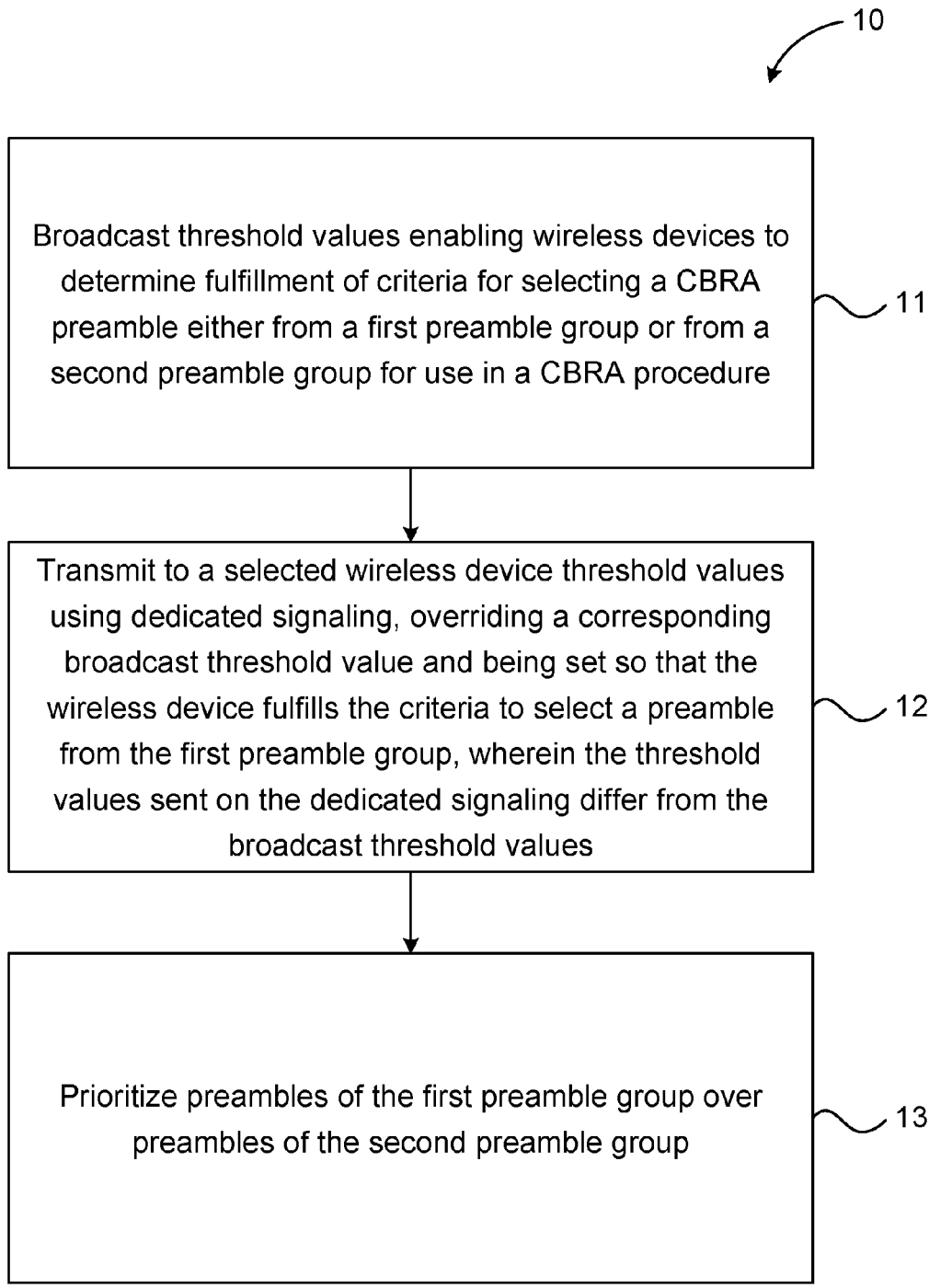
FIG. 3 illustrates a flow chart over steps of a method in a network node in accordance with the present teachings.

FIG. 3 illustrates a flow chart over steps of a method in a network node 2 in accordance with the present teachings. The method is performed in a network node 2 of a wireless communication network 1 providing wireless communication to wireless devices 4, 5, such as the wireless communication network 1 described with reference to FIG. 2.

The method 10 comprises broadcasting 11 one or more threshold values enabling the wireless devices 4, 5 to determine fulfillment of one or more criteria f1, f2 for selecting a contention based random access preamble either from a first preamble group or from a second preamble group for use in a contention based random access procedure. That is, one or more threshold values are broadcasted providing the wireless devices 4, 5 with threshold values for use in determining if one or more criteria is fulfilled for selecting a random access preamble from a first preamble group or from a second preamble group for use in a contention based random access procedure.

The method 10 further comprises transmitting 12 to a selected wireless device 4, 5 one or more threshold values using dedicated signaling, the one or more threshold values sent in the dedicated signaling overriding a corresponding broadcasted threshold value and being set so that the wireless device 4, 5 fulfills the criteria to select a preamble from the first preamble group, wherein the threshold values sent on the dedicated signaling differ from the broadcast threshold values.

The method 10 further comprises prioritizing 13 preambles of the first preamble group over preambles of the second preamble group.

In an embodiment, the broadcasted threshold values are set so that all or close to all of the wireless devices 4, 5 fulfills the criteria to select a preamble from the second preamble group. That is, the one or more threshold values that are transmitted using dedicated signaling are set so that the wireless device 4, 5 with very high probability fulfills a criterion f1, f2 to select a preamble from the first preamble group. By broadcasting virtually "impossible" threshold values to all wireless devices, and then selecting particular wireless devices which obtain other, highly possible threshold values overriding the initially broadcast threshold values, a prioritization within CBRA procedure is enabled. The wireless devices using the "impossible" threshold values are directed towards choosing preambles from the second preamble group (e.g. group A of LTE), and the selected wireless devices (e.g. HO wireless devices) are directed towards choosing threshold values directing them to choose their preamble from the first preamble group (e.g. group B of LTE).

In an embodiment thus, the prioritizing 13 comprises scheduling a wireless device 4 that is transmitting a preamble from the first preamble group before a wireless device 5 that is transmitting a preamble from the second preamble group.

In an embodiment, the prioritizing 13 comprises scheduling wireless devices in the falling order of: received contention free random access preambles, received contention based random access preamble from the first preamble group and received contention based random access preamble from the second preamble group. The network node 2 may be configured to measure the received power of the different random access preambles and sort them in the falling order of received power within each group of preambles.

In an embodiment, the selected wireless device 4, 5 comprises a wireless device 4, 5 performing a handover and wherein the dedicated signaling comprises radio resource control reconfiguration signaling used for sending handover commands.

In various embodiments, the broadcast one or more threshold values comprises one or more of: a first threshold value (messageSizeGroupA) for data buffer size of the wireless device (4, 5) for selecting preambles of the second group of preambles, a second threshold value ($P_{CMAX,c}$) for configured wireless device (4, 5) transmission power, a third threshold value (preambleInitialReceivedTargetPower) for target power of initial target power of received preamble, a fourth threshold value (deltaPreamble Msg3) for offset between a transmitted preamble and a scheduled transmission, and a fifth threshold value (messagePowerOffsetGroupB) for power offset for selecting preambles of the first group of preambles. In a particular embodiment, all five threshold values are broadcast to the wireless devices.

In an embodiment, one of the one or more broadcast threshold values comprise a fifth threshold value (messagePowerOffsetGroupB) for power offset for selecting preambles of the first group of preambles, wherein the fifth threshold value (messagePowerOffsetGroupB) is set larger than 18 dB, in particular set to larger than 50 dB or larger than 100 dB. By using such value of the fifth threshold value, the non-selected wireless devices will most likely break the criteria f2, thus choosing a preamble from the second preamble group. As mentioned earlier, in order to conform to 3GPP 36.331 RRC protocol specification, this would imply a change of the range as presently defined therein.

In an embodiment, the threshold values sent in the dedicated signaling overriding a corresponding broadcasted threshold value comprise one or both of: a first threshold value (messageSizeGroupA) for data buffer size of the wireless device 4, 5 for selecting preambles of the second group of preambles, wherein the first threshold value (messageSizeGroupA) is set to 56 or less than 56, and a fifth threshold value (messagePowerOffsetGroupB) for power offset for selecting preambles of the first group of preambles, wherein the fifth threshold value (messagePowerOffsetGroupB) is set to −infinity.

Figure 4:
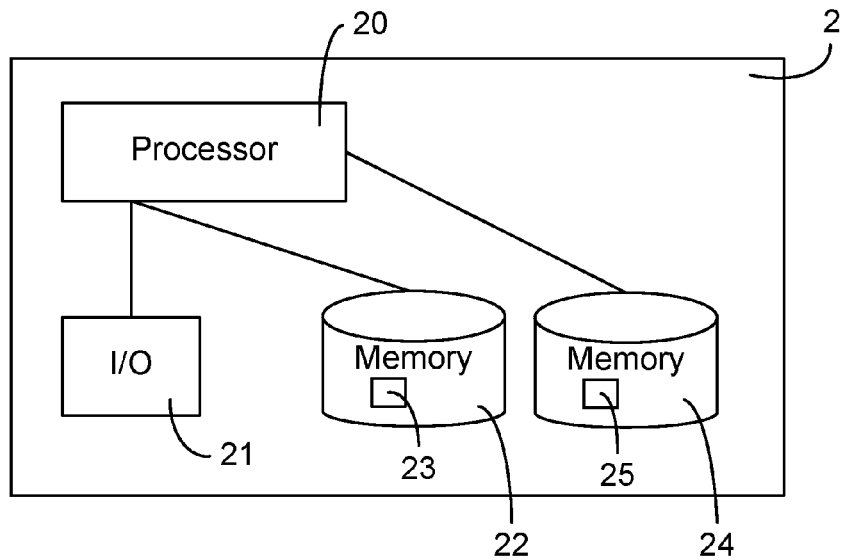
FIG. 4 illustrates schematically a network node and means for implementing embodiments of the method of the present teachings.

FIG. 4 illustrates schematically a network node and means for implementing embodiments of the method of the present teachings. The network node 2 comprises a processor 20 comprising any combination of one or more of a central processing unit (CPU), multiprocessor, microcontroller, digital signal processor (DSP), application specific integrated circuit etc. capable of executing software instructions stored in a memory 22, which can thus be a computer program product. The processor 20 can be configured to execute any of the various embodiments of the method 10 as described in relation to FIG. 3.

In particular, a network node 2 of a wireless communication network 1 is provided. The wireless communication network 1 provides wireless communication to wireless devices 4, 5. The network node 2 comprises a processor 20 and memory 22, the memory 22 containing instructions executable by the processor 23, whereby the network node 2 is operative to:
- broadcast one or more threshold values enabling the wireless devices 4, 5 to determine fulfillment of one or more criteria f1, f2 for selecting a contention based random access preamble either from a first preamble group or from a second preamble group for use in a contention based random access procedure,
- transmit to a selected wireless device 4, 5 one or more threshold values using dedicated signaling, the one or more threshold values sent in the dedicated signaling overriding a corresponding broadcasted threshold value and being set so that the wireless device 4, 5 fulfills the criteria to select a preamble from the first preamble group, wherein the threshold values sent on the dedicated signaling differ from the broadcast threshold values, and
- prioritize preambles of the first preamble group over preambles of the second preamble group.

In an embodiment, the broadcasted threshold values are set so that all or close to all of the wireless devices 4, 5 fulfills the criteria to select a preamble from the second preamble group.

In an embodiment, the network node 2 is configured to prioritize by scheduling a wireless device 4 transmitting a preamble from the first preamble group before a wireless device 5 transmitting a preamble from the second preamble group.

In an embodiment, the network node 2 is configured to prioritize by scheduling wireless devices in the falling order of: received contention free random access preambles, received contention based random access preamble from the first preamble group and received contention based random access preamble from the second preamble group.

In an embodiment, the selected wireless device 4, 5 comprises a wireless device 4, 5 performing a handover and wherein the dedicated signaling comprises radio resource control reconfiguration signaling used for sending handover commands.

In various embodiment, the broadcast one or more threshold values comprises a threshold determined based on one or more of a first threshold value (messageSizeGroupA) for data buffer size of the wireless device 4, 5 for selecting preambles of the second group of preambles, a second threshold value ($P_{CMAX,c}$) for configured wireless device 4, 5 transmission power, a third threshold value (preambleInitialReceivedTargetPower) for target power of initial target power of received preamble, a fourth threshold value (deltaPreamble Msg3) for offset between a transmitted preamble and a scheduled transmission, and a fifth threshold value (messagePowerOffsetGroupB) for power offset for selecting preambles of the first group of preambles. In a particular embodiment, all the threshold values (first, second, third, fourth and fifth) are broadcast and then used by the wireless device to determine fulfillment of criteria.

In an embodiment, one of the one or more broadcast threshold values comprise a fifth threshold value (messagePowerOffsetGroupB) for power offset for selecting preambles of the first group of preambles, wherein the fifth threshold value (messagePowerOffsetGroupB) is set larger than 18 dB, in particular set to larger than 50 dB or larger than 100 dB.

In an embodiment, the threshold values sent in the dedicated signaling overriding a corresponding broadcasted threshold value comprise one or both of: a first threshold value (messageSizeGroupA) for data buffer size of the wireless device 4,5 for selecting preambles of the second group of preambles, wherein the first threshold value (messageSizeGroupA) is set to 56 or less than 56, and a fifth threshold value (messagePowerOffsetGroupB) for power offset for selecting preambles of the first group of preambles, wherein the fifth threshold value (messagePowerOffsetGroupB) is set to −infinity.

Still with reference to FIG. 4, the memory 22 can be any combination of read and write memory (RAM) and read only memory (ROM). The memory 22 also comprises persistent storage, which, for example, can be any single one or combination of magnetic memory, optical memory, solid state memory or even remotely mounted memory.

A data memory 24 may also be provided for reading and/or storing data during execution of software instructions in the processor 20. The data memory 24 can be any combination of read and write memory (RAM) and read only memory (ROM).

The network node 2 further comprises an input/output (I/O) device 21 operatively connected to the processor 20. The I/O device 21 is configured to receive/transmit signaling from/to the wireless devices 4,5 using other intermediate devices, e.g. antennas. The I/O device 21 is also typically configured to communicate with other network nodes through wired connections, e.g. backhaul connections. Although illustrated in the FIG. 4 as a single unit, the I/O device may alternatively comprise several units, and it may be implemented in hardware and/or software.

The present teachings also encompass computer program 23 for a network node 2 of a communication system 1. The computer program 23 is for a network node 2 of a wireless communication network 1 providing wireless communication to wireless devices 4,5. The computer program 24 comprises computer program code, which, when run on the network node 2 causes the network node 2 to perform any of the described embodiments of the method 10. In particular, causes the network node 2 to:
- broadcast one or more threshold values enabling the wireless devices 4,5 to determine fulfillment of one or more criteria f1, f2 for selecting a contention based random access preamble either from a first preamble group or from a second preamble group for use in a contention based random access procedure,
- transmit to a selected wireless device 4,5 one or more threshold values using dedicated signaling, the one or more threshold values sent in the dedicated signaling overriding a corresponding broadcasted threshold value and being set so that the wireless device 4,5 fulfills the criteria to select a preamble from the first preamble group, wherein the threshold values sent on the dedicated signaling differ from the broadcast threshold values, and prioritize preambles of the first preamble group over preambles of the second preamble group.

The teachings of the present application also encompasses such computer program product 22 comprising a computer program 23 as described above, and a computer readable means on which the computer program 23 is stored. The computer program product 22 may be any combination of read and write memory (RAM) or read only memory (ROM). The computer program product 22 may also comprise persistent storage, which for example can be any single one or combination of magnetic memory, optical memory or solid state memory.

The computer program product 22, or the memory 22, thus comprises instructions executable by the processor 20. Such instructions may be comprised in a computer program 23, or in one or more software modules or function modules.

Figure 5:
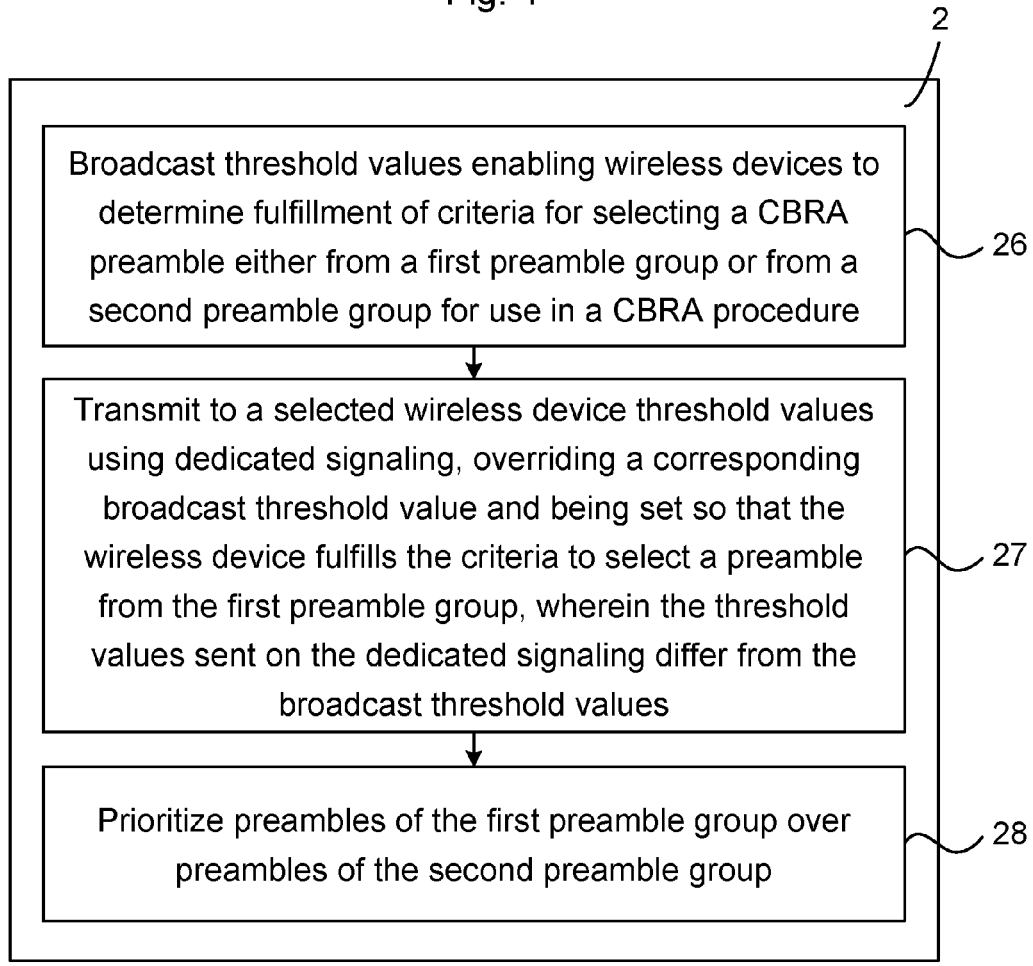
FIG. 5 illustrates a network node comprising functions modules/software modules for implementing embodiments of the method of the present teachings.

FIG. 5 illustrates a network node 2 comprising function modules and/or software modules for implementing embodiments of the method of the present teachings. The network node 2 comprises means 26, in particular a first function module 26, for broadcasting one or more threshold values enabling the wireless devices 4, 5 to determine fulfillment of one or more criteria f1, f2 for selecting a contention based random access preamble either from a first preamble group or from a second preamble group for use in a contention based random access procedure. The network node 2 comprises means 27, in particular a second function module 27, for transmitting to a selected wireless device 4, 5 one or more threshold values using dedicated signaling, the one or more threshold values sent in the dedicated signaling overriding a corresponding broadcasted threshold value and being set so that the wireless device 4, 5 fulfills the criteria to select a preamble from the first preamble group, wherein the threshold values sent on the dedicated signaling differ from the broadcast threshold values. The network node 2 comprises means 28, in particular a third function module 28, for prioritizing preambles of the first preamble group over preambles of the second preamble group.

The functions modules 26, 27, 28 can be implemented using software instructions such as computer program executing in a processor and/or using hardware, such as application specific integrated circuits, field programmable gate arrays, discrete logical components etc.

The present teachings provides a means to increase the probability of separating HO wireless devices from other wireless devices by taking full advantage of the dedicated RRC signaling and lead the wireless devices into different CBRA preamble groups as a result. In particular, the present teachings describe a new way of handling CBRA preamble group A and group B enabling prioritized CBRA for e.g. HO wireless devices. An advantage of the present teachings is thus that HO wireless devices can be prioritized within the CBRA. As HO drop rate is one of the most important parameters for operators of communication networks, this is a most welcome aspect.

The present teachings impose a value range change to an existing parameter in 3GPP 36.331 RRC protocol specification to the existing standard. Embodiments of the present teachings comprise the following:

Broadcasting of fine-tuned values for certain thresholds. For example, the SIB broadcasting is an existing implementation which can be taken advantage of, but different values for the thresholds will be applied. The present teachings may thus easily be implemented in existing solutions.

RRC signaling to include fine-tuned values for those thresholds. RRC signaling is also an existing implementation which can be taken advantage of, and which thus means minimal implementation effort when implementing aspects of the present teachings.

On the eNB side sorting of preambles based on groups is implemented; in particular in the sorting order of CFRA, CBRA group B, CBRA group A.

On wireless devices side, the wireless devices needs to be prepared to be configured to be able to interpret the changed parameter value range.

Although the present teachings have been described and exemplified mainly with reference to LTE, communication systems using other standards for the wireless communication may also benefit from the present teachings, provided that the communication system uses contention based random access. An example of such other communication system comprises Wideband Code Division Multiple Access (WCDMA).

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in a network node of a wireless communication network providing wireless communication to wireless devices, the method comprising:
   broadcasting one or more threshold values enabling the wireless devices to determine fulfillment of one or more criteria for selecting a contention based random access preamble either from a first preamble group or from a second preamble group for use in a contention based random access procedure,
   transmitting to a selected wireless device one or more threshold values using dedicated signaling, the one or more threshold values sent in the dedicated signaling overriding a corresponding broadcasted threshold value and being set so that the wireless device fulfills the criteria to select a preamble from the first preamble group, wherein the threshold values sent on the dedicated signaling differ from the broadcast threshold values, and
   prioritizing preambles of the first preamble group over preambles of the second preamble group.

2. The method as claimed in claim 1, wherein the broadcasted threshold values are set so that all or close to all of the wireless devices fulfills the criteria to select a preamble from the second preamble group.

3. The method as claimed in claim 1, wherein the prioritizing comprises scheduling a wireless device that is transmitting a preamble from the first preamble group before a wireless device that is transmitting a preamble from the second preamble group.

4. The method as claimed in claim 1, wherein the prioritizing comprises scheduling wireless devices in the falling order of: received contention free random access preambles, received contention based random access preamble from the first preamble group and received contention based random access preamble from the second preamble group.

5. The method as claimed in claim 1, wherein the selected wireless device comprises a wireless device performing a handover and wherein the dedicated signaling comprises radio resource control reconfiguration signaling used for sending handover commands.

6. The method as claimed in claim 1, wherein the broadcast one or more threshold values comprises one or more of a first threshold value for data buffer size of the wireless device for selecting preambles of the second group of preambles, a second threshold value for configured wireless device transmission power, a third threshold value for target power of initial target power of received preamble, a fourth threshold value for offset between a transmitted preamble and a scheduled transmission, and a fifth threshold value for power offset for selecting preambles of the first group of preambles.

7. The method as claimed in claim 1, wherein one of the one or more broadcast threshold values comprise a fifth threshold value for power offset for selecting preambles of the first group of preambles, wherein the fifth threshold value is set larger than 18 dB, in particular set to larger than 50 dB or larger than 100 dB.

8. The method as claimed in claim 1, wherein the threshold values sent in the dedicated signaling overriding a corresponding broadcasted threshold value comprise one or both of: a first threshold value for data buffer size of the wireless device for selecting preambles of the second group of preambles, wherein the first threshold value is set to 56 or less than 56, and a fifth threshold value for power offset for selecting preambles of the first group of preambles, wherein the fifth threshold value is set to −infinity.

9. A network node of a wireless communication network providing wireless communication to wireless devices, the network node comprising a processor and memory, the memory containing instructions executable by the processor, whereby the network node is operative to:
broadcast one or more threshold values enabling the wireless devices to determine fulfillment of one or more criteria for selecting a contention based random access preamble either from a first preamble group or from a second preamble group for use in a contention based random access procedure,
transmit to a selected wireless device one or more threshold values using dedicated signaling, the one or more threshold values sent in the dedicated signaling overriding a corresponding broadcasted threshold value and being set so that the wireless device fulfills the criteria to select a preamble from the first preamble group, wherein the threshold values sent on the dedicated signaling differ from the broadcast threshold values, and
prioritize preambles of the first preamble group over preambles of the second preamble group.

10. The network node as claimed in claim 9, wherein the broadcasted threshold values are set so that all or close to all of the wireless devices fulfills the criteria to select a preamble from the second preamble group.

11. The network node as claimed in claim 9, wherein the network node is configured to prioritize by scheduling a wireless device transmitting a preamble from the first preamble group before a wireless device transmitting a preamble from the second preamble group.

12. The network node as claimed in claim 9, wherein network node is configured to prioritize by scheduling wireless devices in the falling order of: received contention free random access preambles, received contention based random access preamble from the first preamble group and received contention based random access preamble from the second preamble group.

13. The network node as claimed in claim 9, wherein the selected wireless device comprises a wireless device performing a handover and wherein the dedicated signaling comprises radio resource control reconfiguration signaling used for sending handover commands.

14. The network node as claimed in claim 9, wherein the broadcast one or more threshold values comprises a threshold determined based on one or more of a first threshold value for data buffer size of the wireless device for selecting preambles of the second group of preambles, a second threshold value for configured wireless device transmission power, a third threshold value for target power of initial target power of received preamble, a fourth threshold value for offset between a transmitted preamble and a scheduled transmission, and a fifth threshold value for power offset for selecting preambles of the first group of preambles.

15. The network node as claimed in claim 9, wherein one of the one or more broadcast threshold values comprise a fifth threshold value for power offset for selecting preambles of the first group of preambles, wherein the fifth threshold value is set larger than 18 dB, in particular set to larger than 50 dB or larger than 100 dB.

16. The network node as claimed in claim 9, wherein the threshold values sent in the dedicated signaling overriding a corresponding broadcasted threshold value comprise one or both of: a first threshold value for data buffer size of the wireless device for selecting preambles of the second group of preambles, wherein the first threshold value is set to 56 or less than 56, and a fifth threshold value for power offset for selecting preambles of the first group of preambles, wherein the fifth threshold value is set to −infinity.

17. A computer program product comprising a computer program and a computer readable means on which the computer program is stored, the computer program for a network node of a wireless communication network providing wireless communication to wireless devices, the computer program comprising computer program code, which, when run on the network node causes the network node to:
broadcast one or more threshold values enabling the wireless devices to determine fulfillment of one or more criteria for selecting a contention based random access preamble either from a first preamble group or from a second preamble group for use in a contention based random access procedure,
transmit to a selected wireless device one or more threshold values using dedicated signaling, the one or more threshold values sent in the dedicated signaling overriding a corresponding broadcasted threshold value and being set so that the wireless device fulfills the criteria to select a preamble from the first preamble group, wherein the threshold values sent on the dedicated signaling differ from the broadcast threshold values, and
prioritize preambles of the first preamble group over preambles of the second preamble group.

* * * * *